Dec. 2, 1930.  J. B. KIRBY  1,783,380
MECHANICAL MOVEMENT
Filed March 31, 1928
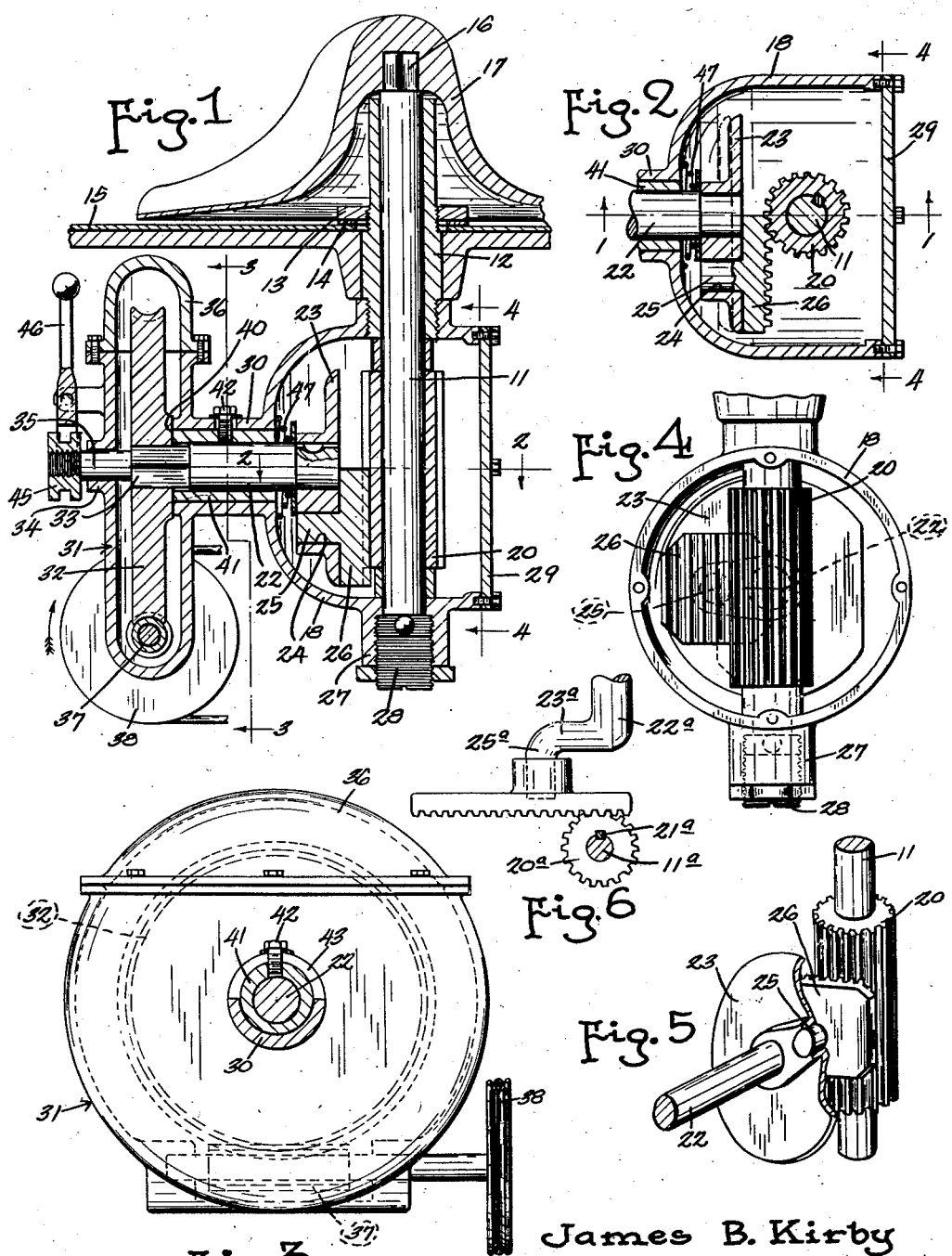
James B. Kirby
Inventor
by Smith and Freeman
Attorneys Patented Dec. 2, 1930

1,783,380

UNITED STATES PATENT OFFICE

JAMES B. KIRBY, OF WEST RICHFIELD, OHIO

MECHANICAL MOVEMENT

Application filed March 31, 1928. Serial No. 266,192.

This invention relates to mechanical movements and has for its object the provision of gearing of maximum compactness and simplicity for the purpose of converting a continuous rotary motion into an oscillating rotary motion, especially as between two shafts perpendicular to each other in substantially the same plane. Another object of the invention is the provision of a gearing of this character having wide manufacturing tolerance, and one which will operate successfully and quietly despite considerable variations in the position of the different parts. An additional object is the provision of simple and convenient means for adjusting the several parts, without interfering with other parts; while further objects and advantages of the invention will become apparent as the description proceeds.

In the drawings accompanying and forming a part of this application I have shown one physical structure in which my inventive ideas are embodied although it will be understood that the same is intended to be merely illustrative of the principles of my invention and not exhaustive of the different modes of application thereof. In these drawings Fig. 1 is a vertical sectional view through a preferred washing machine gearing embodying my improvements; Fig. 2 is a horizontal sectional view corresponding to the line 2—2 thereof; Figs. 3 and 4 are vertical sectional views corresponding to the lines 3—3 and 4—4 respectively of Fig. 1; Fig. 5 is a perspective view of part of said gearing; and Fig. 6 illustrates a slightly modified form of device.

In the embodiment here chosen for such illustrative purposes I have shown a driving shaft 11 journaled in a vertical hollow sleeve 12 clamped by means of a nut 13 and packing 14 in the bottom 15 of a washing machine tub, the upper end of the shaft being squared as at 16 for the reception of an oscillating dasher 17 of any suitable or desired shape or construction. Secured to the lower end of the sleeve 12 is a hollow gear housing 18.

Tightly secured to the shaft 11 inside this housing is an elongated toothed pinion 20. Journaled in the housing 18 perpendicular to the shaft 11 and preferably in substantially the same plane therewith is the driving shaft 22, provided at its end nearest the shaft 11 with a flat-faced disk 23 rigidly keyed thereto and formed at one side of the shaft 22 with an aperture 24 parallel to said shaft in which is journaled a stud 25 projecting from the rear face of a rack-section 26. The forward face of said rack-section is formed with teeth which mesh with the teeth of the pinion 20, while its rearward face is flat and smooth to bear against the face of the disk 23. This disk 23 and eccentrically located stud 25 constitute one variety of crank and any other type of crank can be substituted therefor, for example the type in Fig. 6, and the crank pin 25$^a$ can be inserted in an aperture in the rack, and the shaft 22$^a$ displaced out of the plane of the shaft 11$^a$ and the pinion 20$^a$ slidable along the shaft 11$^a$ and spline 21$^a$.

I have shown the bottom of the housing 18 as provided with a socket 27 receiving the lower end of the shaft 11 and closed by a vertically adjustable screw plug 28 by which the height of said shaft can be adjusted; and I have shown the side of said housing opposite the shaft 22 as closed by a removable plate 29 thus providing for the assembling of the parts. The interior of the housing is originally packed with grease sufficient for several years running.

Any suitable or desired means can be employed for driving the shaft 22. In the present embodiment I have shown the housing 18 as formed around said shaft with a horizontal integral neck 30 terminating in a second housing 31 in which is a worm gear 32 operatively connected to the shaft 22. The end of shaft 22 is here squared as at 33 for the slidable engagement of said gear, the opposite face of the housing 31 being formed with a hollow boss 34 through which projects an extension 35 of the shaft 22. One part of the housing 31 is made removable as indicated at 36 to enable assembling, and another part is provided with a suitable worm 37 meshing with the gear 32 and provided outside said housing with a suitable driving device such as the belt pulley 38. The thrust of the worm always tends to force the gear 32 axially in one direction against a suitable thrust bearing 40 prepared therefor. In order to enable ready adjustment between the worm wheel and worm I have shown an eccentric bushing 41 as interposed between the drive shaft 22 and neck 30. A convenient mode of adjusting and holding this bushing is a short radial clamping screw 42 working through an arcuate slot 43 formed in said neck.

The end of the shaft extension 35 is provided with a suitable knob or clutch-spool 45 engaged by a suitable shifting lever 46 by which the crank 23 can be drawn away from the pinion to disengage the rack against the tension of the spring 47 which normally holds the rack and pinion in engagement.

As the shaft 22 is rotated the rack 26 alternately occupies positions above and below the same, sliding longitudinally of the gear 20 at the end of each stroke, but always maintaining a uniform engagement with that pinion, and also held by that pinion in uniform engagement with the face of the plate 23. I apply the term "crank" both to the disk and stud construction shown in Figs. 1, 2, 4, and 5, and to the offset construction shown in Fig. 6. The only manufacturing requirement is that the angle between the shafts 11 and 22 be substantially a right angle but considerable displacement between their respective planes can occur, or considerable movement of the two shafts within those planes without interfering with the operation. It is for this reason that the eccentric bushing 41 can be employed to adjust the relation between the worm and its gear. However, it will be understood that other adjustments can be employed, or all adjustments omitted, or different driving means employed for the shaft 22, or different driven devices attached to the shaft 11, or the gearing applied to other purposes than those of washing machines, and many changes in the housing and other parts accomplished; and I do not limit myself in any wise except as specifically recited in my several claims which I desire may be construed broadly each independent of limitations contained in other claims.

Having thus described my invention what I claim is:

1. In a reversing mechanism, a driven shaft, a driving shaft perpendicular thereto, an elongated pinion carried by said driven shaft and extending past the end of said driving shaft, a crank carried by the end of said driving shaft, and a rack pivoted to said crank intermediate its length and slidable lengthwise of said pinion while meshing therewith.

2. In a reversing mechanism, in combination, an elongated pinion, a rack narrower than said pinion and meshing therewith, a driving shaft journaled perpendicularly to said pinion and located intermediate the length of said pinion, and means pivoting said rack to said driving shaft upon an axis which is parallel to the axis of said shaft and eccentric thereof.

3. In a reversing gearing, the combination with two shafts perpendicular to each other, an elongated pinion carried by one shaft and a crank carried by the other, of a rack journaled to said crank and meshing with said pinion, said rack being slidable lengthwise of said pinion in accordance with the parallax of said crank.

4. In a reversing gearing, the combination with a vertical shaft and a horizontal shaft, of bearing means wherein said vertical shaft is journaled for rotation and secured against lengthwise movement, a toothed wheel carried by said vertical shaft, and a toothed member journaled eccentrically to said horizontal shaft so as to occupy constantly progressing positions about said horizontal shaft while constantly meshing with said wheel.

5. In a reversing gearing, the combination with two perpendicular shafts, of a pinion carried by one of the same, a rack meshing therewith and constrained thereby to move with its margin always parallel to the same straight line, and an end crank carried by the other shaft and articulated to said rack intermediate its ends.

6. In a reversing gearing two perpendicular shafts located substantially in the same plane, a toothed pinion carried by the one, an end crank carried by the other, a toothed member meshing with said pinion and axially movable with respect thereto, and operative connections between said member and crank whereby said member is caused to execute simple harmonic motion past said pinion both longitudinally and transversely.

7. In a gearing, a housing having two perpendicular bearings located substantially in the same plane, a shaft journaled in each bearing, a toothed member carried by one shaft, an end crank carried by the other shaft, a rack element journaled to said crank intermediate its length and located between said crank and toothed member, and means for moving said second shaft lengthwise to engage and disengage said rack.

8. In a gearing a housing having two chambers and a bearing between them, a shaft journaled in said bearing, a driving gear on one end of said shaft and located in one chamber, an end crank on the other end of said shaft and located in the other chamber, a driven shaft journaled in said last chamber and extending across the end of said first shaft, perpendicular thereto, a gear on said last shaft, and a rack interposed between said crank and gear, said rack meshing with said gear and engaged by said crank at a point intermediate the ends of said rack.

9. In a reversing gearing two perpendicular shafts located substantially in the same plane, a pinion carried by the one shaft and crossing the axis of the other shaft, an end crank carried by said other shaft, a rack interposed between said crank and pinion and pivoted to said crank, and means for moving said crank axially to make and break engagement between said rack and pinion.

10. A mechanical movement comprising a rotatable member, a shaft perpendicular thereto, and journaled for rotational movement, means securing said shaft against axial movement, a pinion carried by said shaft, a crank carried by said rotatable member, and a rack journaled to said crank and meshing with said pinion.

11. In a gearing, in combination, a shaft, a pinion opposite the end of said shaft and having its axis perpendicular thereto, a rack interposed between said shaft and pinion and meshing with said pinion, means for holding said pinion against axial movement, and a driving connection between said shaft and rack eccentric with the shaft axis whereby said rack is oscillated.

In testimony whereof I hereunto affix my signature.

JAMES B. KIRBY.